United States Patent
Nogaret et al.

(10) Patent No.: US 7,992,890 B2
(45) Date of Patent: Aug. 9, 2011

(54) AIRBAG GUIDE WITH A COVERING

(75) Inventors: Eric Nogaret, Biesheim (FR); Bernd Freystedt, Wiesbaden (DE)

(73) Assignee: Peguform GmbH, Bötzingen (DE)

( * ) Notice: Subject to any disclaimer, the term of this patent is extended or adjusted under 35 U.S.C. 154(b) by 259 days.

(21) Appl. No.: 12/280,501

(22) PCT Filed: Feb. 21, 2007

(86) PCT No.: PCT/EP2007/001504
§ 371 (c)(1),
(2), (4) Date: Dec. 4, 2008

(87) PCT Pub. No.: WO2007/096147
PCT Pub. Date: Aug. 30, 2007

(65) Prior Publication Data
US 2009/0218792 A1    Sep. 3, 2009

(30) Foreign Application Priority Data

Feb. 22, 2006 (DE) .......................... 10 2006 008 564

(51) Int. Cl.
*B60R 21/215* (2006.01)
*B60R 21/2165* (2006.01)
*B60R 21/205* (2006.01)

(52) U.S. Cl. .................. 280/728.3; 280/728.2; 280/732

(58) Field of Classification Search ............... 280/728.3, 280/728.2, 732
See application file for complete search history.

(56) References Cited

U.S. PATENT DOCUMENTS

| | | | | |
|---|---|---|---|---|
| 5,346,249 A | * | 9/1994 | Hallard et al. | 280/728.3 |
| 6,042,139 A | * | 3/2000 | Knox | 280/728.3 |
| 6,318,752 B1 | * | 11/2001 | Warnecke et al. | 280/728.3 |
| 6,467,800 B1 | * | 10/2002 | Bey et al. | 280/728.3 |
| 7,267,360 B2 | * | 9/2007 | Geum | 280/728.2 |
| 7,293,795 B2 | * | 11/2007 | Kong | 280/732 |
| 2002/0003343 A1 | * | 1/2002 | Kansteiner | 280/728.3 |
| 2011/0062685 A1 | * | 3/2011 | Kim et al. | 280/728.3 |

FOREIGN PATENT DOCUMENTS

| | | |
|---|---|---|
| DE | 29811739 | 9/1998 |
| DE | 19948021 | 4/2001 |
| EP | 0465869 | 1/1992 |
| EP | 0715992 | 6/1996 |
| JP | 2002337640 | 11/2002 |
| JP | 2005212695 | 8/2005 |
| JP | 2005239023 | 9/2005 |
| WO | WO-2008155019 A1 * | 12/2008 |
| WO | WO-2008155020 A1 * | 12/2008 |

* cited by examiner

*Primary Examiner* — Paul N. Dickson
*Assistant Examiner* — Joselynn Y. Sliteris
(74) *Attorney, Agent, or Firm* — Ursula B. Day; Henry M. Feiereisen

(57) ABSTRACT

The present invention provides an airbag guide with a covering which comprises a lid (4) and an airbag guide (7) which are connected to each other by a hinge (10). In the fitted state, the lid (4) is clamped between the airbag guide (7) and the edge region of the outlet opening (2) for the airbag.

18 Claims, 4 Drawing Sheets

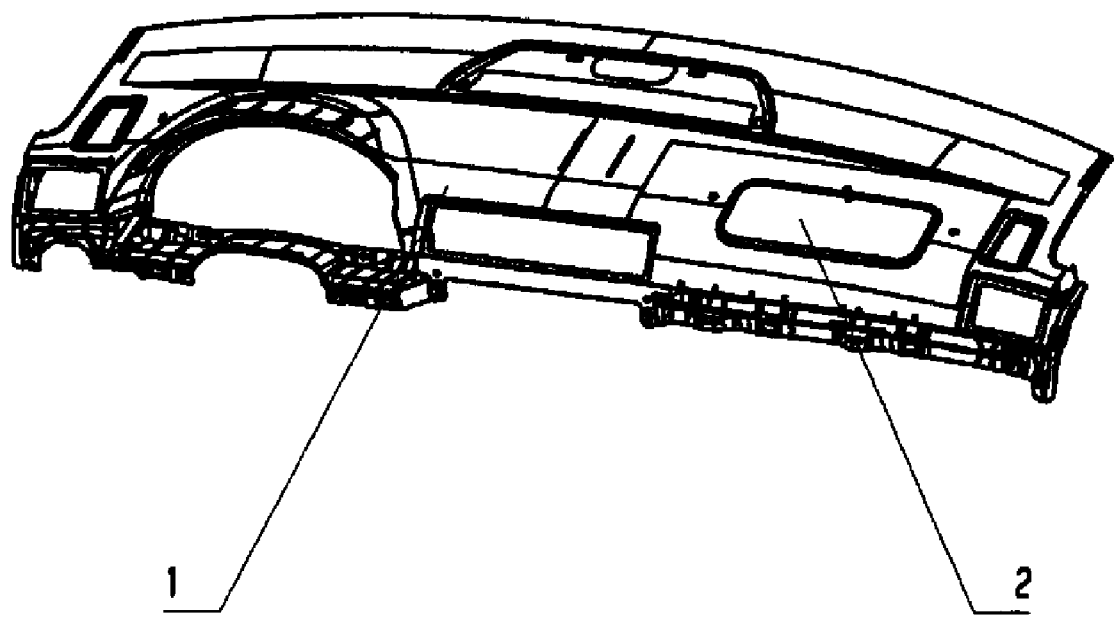
Figur 1

Figur 2
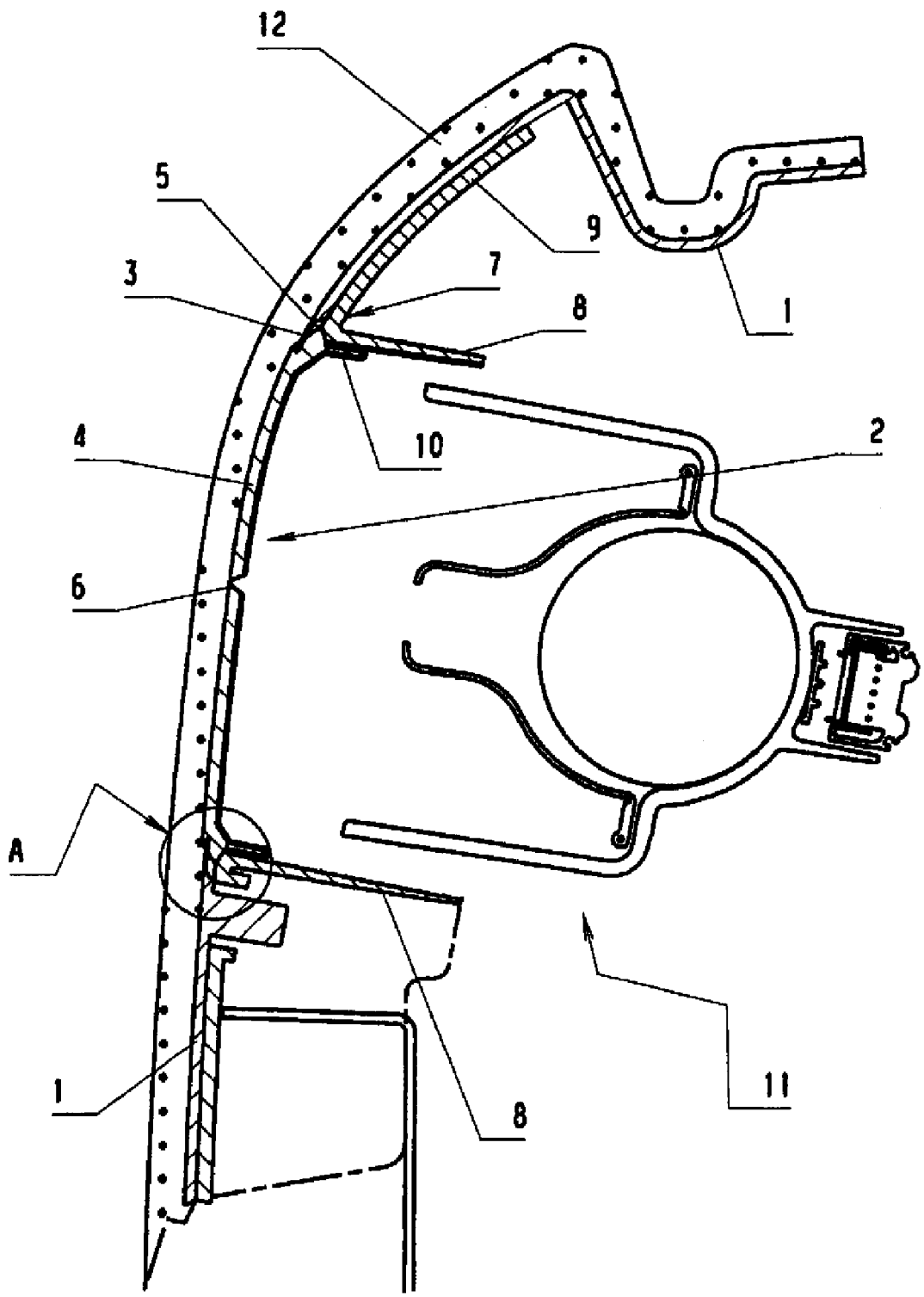

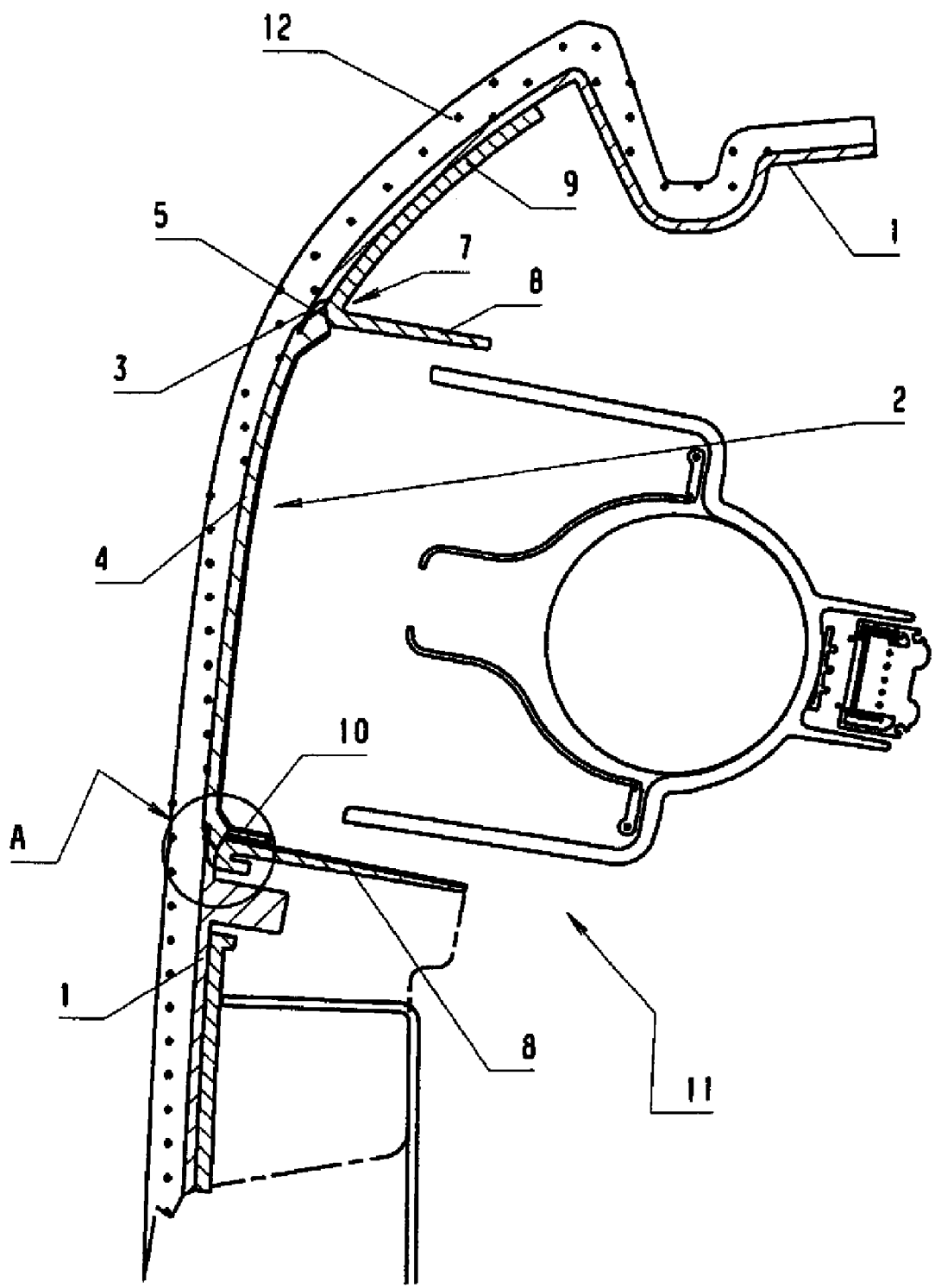
Figur 3

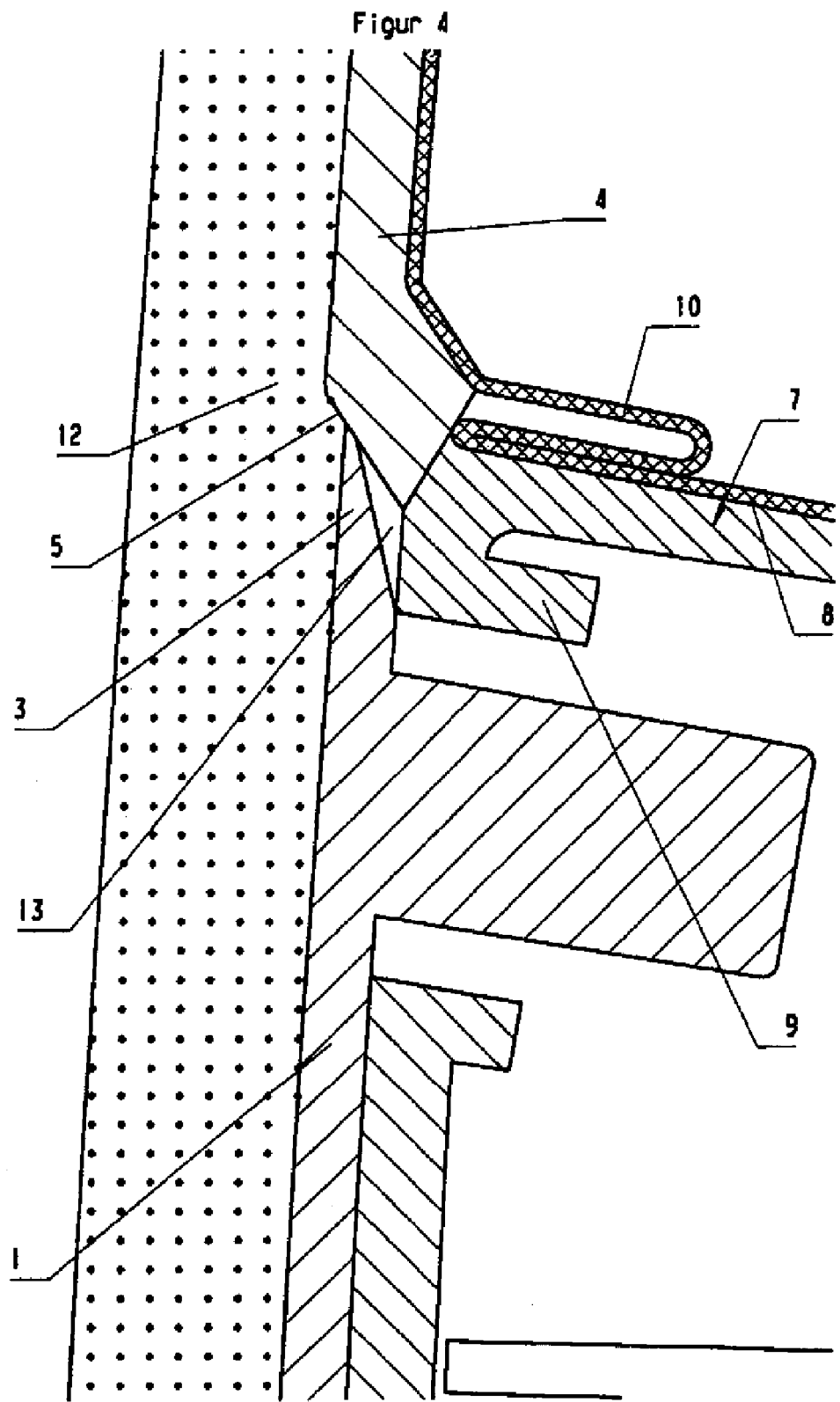

AIRBAG GUIDE WITH A COVERING

BACKGROUND OF THE INVENTION

The present invention refers to an air bag guide with a covering for motor vehicles of the type that includes a cover, an air bag guide and at least one hinge connecting the air bag cover with the air bag guide and at an opening attached to base body.

The invention refers furthermore, to a process for opening a covering of an air bag guide features whereupon release of the air bag, the cover ruptures at a predetermined line but remains connected to the hinge as protection from injuries caused by splinters.

In DE 298 11 739 U1, a dashboard for motor vehicles is described, comprising a base member with an integrated air bag cover on which an inflatable air bag is impinging, wherein the surface which is formed by the base member and air bag cover and which in a fitted state faces the passenger compartment, is covered by a lamination. The lamination is preferred in the area of transition between base member and air bag cover, and is provided with a predetermined breaking line. Furthermore, the dashboard includes a structural element which has a deployment channel segment that guides the inflating air bag in the direction of the air bag cover.

Additional methods and devices for covering air bags are described in DE 199 48 021 A1 and EP 0 465 869 A1 and EP 0715 992 A1.

All of the afore-described devices for covering air bags have in common that they are fully integrated into the base element, for example, the dashboard or the side paneling of the motor vehicle. This results in relatively high expenditure for manufacturing the base member with an integrated air bag module.

In Japanese patent applications JP 2002/337640 A, JP 2005/212695 A and JP 2005/239023A air bag coverings are described, where the cover is not an integral part of the base member. All three patent publications describe however embodiments where the cover and the air bag guide are configured in one piece and are connected with each other in a rigid manner. These embodiments require a relatively extensive production and, at the same time, have the disadvantage that the air bag guide which is rigidly disposed at the cover and thus may act as an obstacle which must be prevented by suitable means.

SUMMARY OF THE INVENTION

The object of the invention is to provide an air bag guide with covering, which does not suffer from the drawbacks of the prior art and which can be produced separate from the base member in a simple and cost efficient manner.

It is a further object of the invention to provide a concept which permits that the air bag guide with the covering can be retrofitted as a module into a specific base member.

It is a further object of the invention to provide a method for opening the covering of an air bag guide which can be used in all types of motor vehicles.

These objects are solved by an air bag guide with a covering that includes a base member with an opening, an air bag cover and at least one hinge connecting the cover and the air bag guide to each other, wherein the air bag guide in a border area of the opening in the base member is firmly connected with the base member and the border area of the opening has a circumferential lip profile and the cover is disposed between the lip profile and the air bag guide, and in fitted state covers the opening in the base member, wherein the cover has a backslopinq surface and in the fitted state supports the lip profile to thereby clamp the cover. A method for opening of a cover of an air bag cover includes that upon release, the inflating air bag is directed by the air bag guide in a direction of the air bag cover, thereby breaking the clamped cover along a predetermined rupture line bordering the cover, and thus swinging open the cover through pressure of the inflating air bag, where, after clearing an outlet, the air bag is entering the passenger compartment, the cover or portions of the cover are being held tight by at least one hinge as splinter protection thereby preventing injuries through loose portions of the cover that could penetrate the passenger compartment.

Preferred embodiments of the air bag according to the invention are reflected in the dependent claims.

The air bag guide with covering according of the present invention consists essentially of a cover, an air bag guide, as well as hinges which connect the cover and the air bag guide to each other. The air bag guide with covering is designed for insertion into an outlet opening for an air bag into a base member, e.g. a dashboard or side paneling of the motor vehicle. The connection of the air bag guide plus covering with the base member is realized via the air bag guide who in turn is constructed with a deployment channel segment and a support segment.

The connection to the base member is realized in the border area of the outlet opening for the air bag via the support segment of the air bag guide and connected to the base member at the side facing away form the passenger compartment. In this border area, the base member shows a lip profile. The base member and the air bag guide are arranged relative to each other in such a way that between the lip profile and the air bag guide, a type of groove forms into which the cover of the air bag guide can be inserted.

In a preferred embodiment, the cover of the air bag guide is provided circumferentially with a back slope on which the lip profile is supported when in a fitted state. Thus, the cover is being clamped between the base member and the air bag guide. At the same time, the cover and base member are being sealed by the lip profile of the base member.

In a preferred embodiment, the cover is configured such that it has at least one predetermined breaking line, which when the cover is actuated breaks due to the inflating air bag and thus the outlet for the air bag opens.

It can be advantageous when the cover is of one piece and upon opening remains in one piece.

In the fitted state, the side of the cover together with the base member facing the passenger compartment is coated with a foam layer as well as a form skin, foil, leather skin or a textile material. During the foaming process, the lip profile acts as a seal against penetrating foam material.

Beside the support segment, the air bag guide has a deployment channel segment which projects from the outlet for the air bag into the area, where the air bag is stored.

In a preferred embodiment, the deployment channel segment extends from the opening in the base member almost at a right angle rearward into the area which is covered by the folded air bag. This deployment channel segment serves to guide the airbag in the direction of the cover upon unfolding. Corresponding to high stress generated due to the deployment of the air bag, the air bag guide is produced from reinforced material, such as e.g. long fibered reinforced polypropylene.

Especially important for the protection of the vehicle passengers in an accident is to make sure that upon impact, no splinter parts of the cover can reach the passenger compartment. Therefore, the cover is firmly attached to the air bag guide by at least with one hinge.

In an advantageous embodiment, a hinge is formed from a material which is preferably a reinforced weave, which covers the cover almost entirely on the reverse side and is also connected across almost the entire interior area of the air bag guide. In this manner, splintering of the cover is prevented and the cover is securely connected with the base member via the air bag guide. Due to the hinge being configured as a reinforced weave and so covers the cover almost entirely, single smaller splinters cannot reach the passenger compartment.

The air bag guide with covering according to the invention is configured in such a way that it can be utilized as a modular assembly in an outlet for the air bag in a corresponding base member, such as for example, as a support for fittings, a dashboard or a side paneling, or parts of these.

The entire assembly of air bag guide, cover and hinge can be produced in one production step, for example, by injection molding.

In a preferred embodiment, the production step can be carried out with different materials, such that for example for the air bag guide, particularly high strength materials can be utilized, while for the cover less firm and more elastic materials can be utilized.

The production and finalizing principle includes that the air bag guide with covering can be retrofitted into a suitable base member, in order to lower production cost. This type of modular assembly has furthermore the advantage that the air bag guide with covering can be utilized for other motor vehicle types without the need for expensive adaptive measures.

BRIEF DESCRIPTION OF THE DRAWING

By means of the corresponding interaction of the lip profile with the slope of the cover, it is possible to calibrate exactly the amount of resistance relative to the opening force.

The invention will be illustrated in detail through the following drawings.

There it is shown in

FIG. 1 a perspective illustration of a dashboard as a base member for the air bag guide with covering according to the present invention, FIG. 2 a section of the air bag guide with covering according to the invention having a two part cover, FIG. 3 a section of an air bag guide with covering according to the invention having a one piece cover and FIG. 4 a detail view of a section of the air bag guide with covering according to the invention of FIGS. 1 and 2.

DETAILED DESCRIPTION OF PREFERRED EMBODIMENTS

FIG. 1 shows a dashboard as a base member 1 for an air bag guide with covering. In the area of the front passenger, an opening 2 is provided as an outlet for the air bag in the base member 1.

In FIG. 2, the principle of the air bag guide with covering according to the invention is shown with the aid of a section view. The air bag guide with covering consisting of a cover 4 an air bag guide 7 and a hinge 10 is inserted in an opening 2 of the base member 1 such that the air bag guide with covering is connected, via the support segment 9 of the air bag guide 7 in the border area of opening 2, with the side of the base member 1 facing away from the passenger compartment. The support segment 9 can be designed in such a manner that it copies and adapts the shape of the base member 1.

Next to the support segment 9 the air bag guide 7 shows a deployment channel segment 8 which extends into the area 11 that is covered by the folded air bag.

The cover 4 is firmly connected to the air bag guide 7 by means of two hinges 10. In the embodiment as shown in FIG. 2, the hinge 10 is configured as a weave, which covers the entire rearward area of the cover 4, with the exception of the area of the predetermined breaking line 6, and covers the inner area of the deployment channel 8 to which it is connected. Such a hinge 10 guarantees a firm connection between the air bag guide 7 and cover 4 and prevents at the same time splintering of the cover 4 upon opening.

In the variant embodiment as shown in FIG. 2, the cover 4 is provided centrally with a predetermined breaking line 6 which breaks upon impact of the unfolding air bag, thus clearing the way for the air bag into the passenger compartment. The outlet opening 2. for the air bag is sealed by means of a lip profile 3 formed in the border region of opening 2 of the base member 1. The lip profile 3 serves to interface with the air bag guide 7 as a mounting for the cover 4. During the foaming process, the lip profile 3 serves simultaneously as a seal against he the still flowing foam material with which the base member 1 and the cover 4 are being coated in the fitted state.

FIG. 3 corresponds to a great extend with FIG. 2. Here, the cover 4 is configured as a single piece and the firm connection of the cover 4 with the air bag guide 7 is accordingly realized only through the hinge 10. In this case, the hinge 10 is likewise constructed from a weave, which covers the entire rearward area of the cover 4 and the inner area of the deployment channel.

FIG. 4 shows a detail from the section views as shown in FIGS. 2 and 3 in which the principle of the process according to the invention can be recognized especially well. Shown is the border area of opening 2 for exiting of the air bag in the condition of the built-in air bag guide with covering. In this area the base member 1 has a marked profile 3 which together with the air bag guide 7 form a groove 13 into which the cover 4 with its slanting slope 5 is clamped. Base member 1 and cover 4 facing the passenger compartment are coated with a foam layer and a decorative layer 12. In this enlarged view, the weave hinge 10 is shown connecting the cover 4 with the air bag guide 7, whereby the reverse side of cover 4 and the inner side of the deployment channel 8 is completely covered by the textile hinge 10.

REFERENCE NUMBER LIST 1 base member
2 Opening
3 Lip profile
4 Cover
5 Slanted slope
6 Predetermined breaking line
7 Air bag guide
8 Deployment channel segment
9 Support segment
10 Hinges
11 Air bag covering area
12 Foam layer with decorative layer
13 Groove

The invention claimed is:
1. An air bag guide with covering, for motor vehicles, comprising:
a base member with an opening
a cover, and at least one hinge connecting the cover and an air bag guide to each other, wherein the air bag guide in a border area of the opening in the base member is firmly connected with the base member, wherein the border area of the opening has a circumferential lip profile and the cover is disposed between the lip profile and the air bag guide, and in fitted state covers the opening in the base member, wherein the cover has a backsloping surface and in the fitted state supports the lip profile and the lip profile thereby clamps the cover.

2. The air bag guide according to claim 1, wherein the hinge extends substantially the entire width of the cover to thus connect the cover and the air bag guide to each other.

3. The air bag guide according to claim 1, wherein an area between the cover and the opening is sealed by the lip profile of the base member.

4. The air bag guide according to claim 1, wherein the cover is provided with at least one predetermined rupture line.

5. The air bag guide according to claim 1, wherein the cover and the base member in the fitted state are coated on a side facing the passenger compartment of a motor vehicle, with a foam layer provided with a decorative layer.

6. The air bag guide according to claim 5, wherein the air bag guide is assembled from a segment of a deployment channel and a support segment.

7. The air bag guide according to claim 6, wherein the air bag guide is adapted to and firmly connected with the base member via the support segment on the side of the base member facing away from the passenger compartment.

8. The air bag guide according to claim 6, wherein a deployment channel segment of the air bag guide extends rearwardly at a substantially right angle into an area covering an air bag.

9. The air bag guide according to claim 1, wherein the air bag guide is produced from a high strength material.

10. The air bag guide according to claim 9, wherein the high strength material is long fiber reinforced propylene.

11. The air bag guide according to claim 1, wherein the at least one hinge connecting the cover and the air bag guide is from weaved material.

12. The air bag guide according to claim 11, wherein the weaved hinge extends substantially AN entire inner area of A deployment channel of the air bag guide on a side of the cover facing away from A passenger compartment of a motor vehicle while firmly connected thereto.

13. The air bag guide according to claim 1, wherein the at least one hinge is attached firmly to the cover and to the air bag guide whereby splinter protection is provided when an inflating air bag impinges upon the cover and opens toward a passenger compartment.

14. The air bag guide according to claim 1, wherein the base member supports a dashboard or a side paneling or a part of a support for the dashboard or the side paneling.

15. The air bag guide according to claim 1, wherein an entire assembly of air bag guide, cover and hinge is produced by injection molding in a single production step.

16. The air bag guide according to claim 15, wherein an the entire assembly is produced from different material components.

17. A method for opening a covering of an air bag guide assembled according to claim 1, comprising the following steps:
  upon release, an inflating air bag is directed by the air bag guide in a direction of a cover,
  the cover swings open through the pressure of the unfolding air bag or breaks along a predetermined rupture line and then opens, whereby an outlet is cleared for the air bag entering a passenger compartment,
  the cover or portions of the cover is held tight by means of at least one hinge as splinter protection thereby preventing injuries through portions of the cover penetrating the passenger compartment.

18. A method for opening an air bag guide covering comprising the following steps:
  providing in a border area of an opening in the base member an air bag guide firmly connected with the base member, wherein the border area of the opening has a circumferential lip profile and an air bag cover is disposed between the lip profile and the air bag guide such that in a fitted state the air bag cover covers the opening in the base member by means of the cover having a backsloping surface supporting the lip profile and the lip profile thereby clamping the cover;
  upon release, an inflating air bag is directed by the air bag guide in a direction of the air bag cover, thereby breaking the clamped cover along a predetermined rupture line bordering the cover, and
  swinging open the cover through pressure of the inflating air bag and after clearing the opening, the air bag enters a passenger compartment, whereby the cover or portions of the cover are held tight by at least one hinge as splinter protection thereby preventing injuries through loose portions of the cover that could penetrate the passenger compartment.

* * * * *